E. C. & T. R. COON.
TREE SUPPORT.
APPLICATION FILED OCT. 25, 1911.

1,040,891.

Patented Oct. 8, 1912.

Witnesses
C. E. Kimper.
John J. McCarthy

Inventors
Eugene C. Coon.
Thomas R. Coon.
By Victor J. Evans
Attorney

UNITED STATES PATENT OFFICE.

EUGENE C. COON AND THOMAS R. COON, OF PORTLAND, OREGON.

TREE-SUPPORT.

1,040,891.  Specification of Letters Patent.  Patented Oct. 8, 1912.

Application filed October 25, 1911. Serial No. 656,578.

*To all whom it may concern:*

Be it known that we, EUGENE C. COON and THOMAS R. COON, citizens of the United States of America, residing at Portland, in the county of Multnomah and State of Oregon, have invented new and useful Improvements in Tree-Supports, of which the following is a specification.

This invention relates to improvements in supports and more particularly to supports for holding the branches of trees in position.

The invention has for one of its objects to provide a device of this character which when applied to the limb of a tree will enable the said limb to be held in any desired position to promote the shape of the tree.

A further object of the present invention is to provide a device of this character which shall be self-supporting upon the limb of a tree and of sufficient strength to hold the limb in any desired position to facilitate the shaping of the tree.

With the above and other objects in view the invention consists in the construction, combination, and arrangement of parts hereinafter described and falling within the scope of the appended claim.

Figure 1:
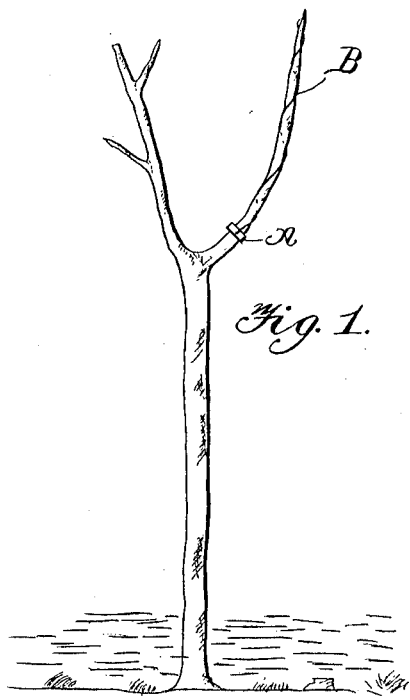
Figure 2:
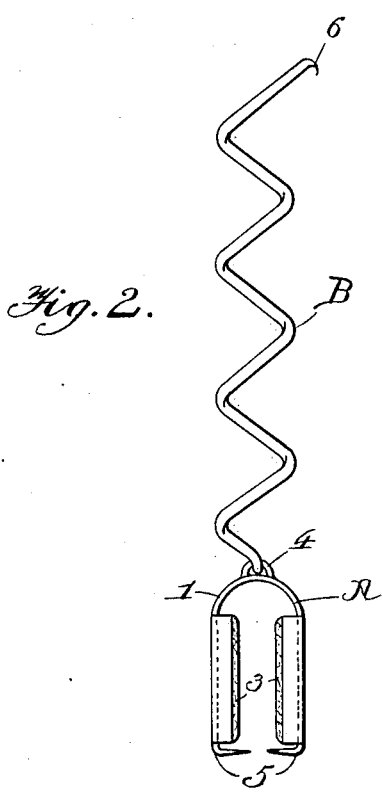
Figure 3:
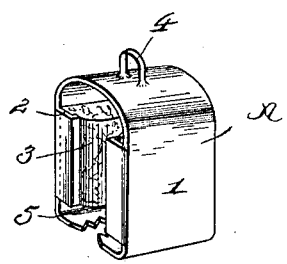
Figure 4:
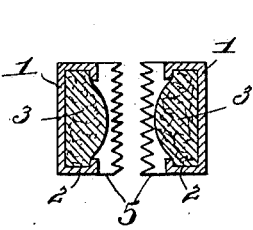

In the drawings forming a portion of this specification; Figure 1 is a side elevation of a tree showing our invention applied to one of the limbs thereof. Fig. 2 is a detail view of a support showing the same detached from the tree. Fig. 3 is a perspective view of a clamp for holding the support in place, and Fig. 4 is a transverse section through the clamp.

Similar reference characters designate like parts throughout the several views.

The invention is more particularly adapted for use in conjunction with young trees or saplings as they are sometimes termed, and when applied to the branches thereof will enable said branches to be trained in any direction whereby to shape the tree as desired.

Referring more particularly to the accompanying drawings, in which we have illustrated the preferred embodiment of our invention, the support comprises a clamping element A and what may be termed a retaining member B, the latter being in the form of an elongated spiral and constructed of steel wire, or any other material best suited for the purpose.

The clamping device A is constructed preferably of metal and comprises a substantially U-shaped member 1, the opposite longitudinal edges of which are inturned to provide grooves or channels 2 designed to receive a pad 3 of felt or other suitable material so that in the application of the clamp to the limb of a tree the pad 3 will prevent mutilation of the limb. Intermediate its ends and upon its exterior surface, the clamp B is provided with an eye 4 to which is connected one end of the retaining member B whereby in the application of the support to a tree, the clamp A will serve to effectively secure the device in position.

In the application of the support to a tree, the clamp A is first placed around the stock or branch of the tree and the spiral retaining member B is wound or wrapped around the said stock or branch above the clamp. The stock or limb can now be bent in any desired position and held in such position by the support, the retaining member being of such a nature that it may be bent with the limb of the tree and at the same time stiff enough to hold the limb in position and permitting the same to vibrate slightly.

The free ends of the U-shaped member 1 of the clamp are bent upon themselves as at 5 to provide hooked terminals whereby the clamp may be rigidly secured to the limb of the tree, the free end of the retaining member B being also provided with a hooked terminal 6 serving to engage the tree to rigidly secure said member B in position.

From the above description taken in connection with the accompanying drawing it will be seen that we have provided a support, which is capable for use on trees, shrubs, or vines, enabling them to grow in any desired direction, and also serving to correct any misshapen branches.

Having thus described our invention what we claim and desire to secure by Letters-Patent is:

A device of the class described including a U-shaped clamping plate adapted to be secured to the limb of a tree, said clamping plate being formed to provide grooves, a pad mounted in the grooves of said plate and adapted to prevent direct contact between the said limb and plate, and a retaining member carried by said plate and adapted to cause the growth of the limb in any desired direction, said retaining member being of spiral form.

In testimony whereof we affix our signatures in presence of two witnesses.

EUGENE C. COON.
THOMAS R. COON.

Witnesses:
B. C. ADAMSON,
ALTON W. ONTHANK.

Copies of this patent may be obtained for five cents each, by addressing the "Commissioner of Patents, Washington, D. C."